US008539576B2

(12) United States Patent
Van der Merwe et al.

(10) Patent No.: US 8,539,576 B2
(45) Date of Patent: Sep. 17, 2013

(54) SYSTEM AND METHOD FOR FILTERING UNWANTED INTERNET PROTOCOL TRAFFIC BASED ON BLACKLISTS

(75) Inventors: Jacobus Van der Merwe, New Providence, NJ (US); Balachander Krishnamurthy, New York, NY (US); Karim M. El Defrawy, Irvine, CA (US); Athina Markopoulou, Irvine, CA (US); Fabio Soldo, Irvine, CA (US)

(73) Assignees: AT&T Intellectual Property II, L.P., Atlanta, GA (US); The Regents of The University of California, Oakland, CA (US)

( * ) Notice: Subject to any disclaimer, the term of this patent is extended or adjusted under 35 U.S.C. 154(b) by 867 days.

(21) Appl. No.: 12/269,387

(22) Filed: Nov. 12, 2008

(65) Prior Publication Data

US 2010/0122335 A1      May 13, 2010

(51) Int. Cl.
*H04L 29/06* (2006.01)
(52) U.S. Cl.
USPC ......... 726/22; 726/11; 726/2; 726/12; 726/13
(58) Field of Classification Search
USPC ..................... 726/11, 2, 12, 13, 22
See application file for complete search history.

(56) References Cited

U.S. PATENT DOCUMENTS

| 7,133,914 B1 * | 11/2006 | Holbrook ................. 709/224 |
| 7,181,764 B2 * | 2/2007 | Zhu et al. ................. 726/4 |
| 7,320,020 B2 | 1/2008 | Chadwick et al. |
| 7,587,760 B1 * | 9/2009 | Day ................. 726/22 |
| 2002/0083175 A1 | 6/2002 | Afek et al. |
| 2003/0014665 A1 | 1/2003 | Anderson et al. |
| 2004/0148520 A1 | 7/2004 | Talpade et al. |
| 2006/0075084 A1 | 4/2006 | Lyon |
| 2006/0075491 A1 | 4/2006 | Lyon |
| 2006/0077964 A1 * | 4/2006 | Wu et al. ................. 370/352 |
| 2006/0206300 A1 | 9/2006 | Garg et al. |
| 2007/0011323 A1 | 1/2007 | Gaal |
| 2008/0126531 A1 * | 5/2008 | Setia et al. ................. 709/224 |
| 2008/0229415 A1 | 9/2008 | Kapoor et al. |
| 2009/0029693 A1 * | 1/2009 | Liwell et al. ................. 455/419 |
| 2009/0064332 A1 * | 3/2009 | Porras et al. ................. 726/23 |

OTHER PUBLICATIONS

K. El Defrawy, A. Markopoulou, and K. Argyraki, "Optimal Allocation of Filters against DDoS Attacks,", in ITA Workshop, San Diego, CA, Jan. 2007.*

"Soft-state Transport Protocol for Anycast-based Content Delivery Networks," Al-Qudah et al., Case Western Reserve University, AT&T Labs—Research, WWW2009, Madrid Spain, Apr. 20-24, 2009, 8 pages.

* cited by examiner

*Primary Examiner* — William Powers
*Assistant Examiner* — Imhotep Durham
(74) *Attorney, Agent, or Firm* — Akerman Senterfitt; Michael K. Dixon; Roy Zachariah

(57) ABSTRACT

A system and method for filtering unwanted Internet Protocol traffic based on blacklists receives a first blacklist containing a first plurality of Internet protocol addresses associated with unwanted Internet traffic. The system also operates a first plurality of access control lists adapted to block the unwanted Internet traffic from one of the first Internet protocol addresses listed in the first blacklist. The system also assigns a first weight to each of the first Internet protocol addresses based on a reliability of Internet traffic from each of the first Internet protocol addresses. Additionally, the system reduces a first number of the first access control lists to optimally trade off a number of desirable Internet protocol addresses blocked with a number of bad Internet protocol addresses blocked based on the first weight of each of the first Internet protocol addresses.

20 Claims, 6 Drawing Sheets

SYSTEM AND METHOD FOR FILTERING UNWANTED INTERNET PROTOCOL TRAFFIC BASED ON BLACKLISTS

FIELD OF THE DISCLOSURE

The present disclosure generally relates to communications networks, and more particularly relates to a system and method for filtering unwanted Internet protocol traffic based on blacklists.

BACKGROUND

The Internet is an increasingly important communication channel that continues to grow in traffic volume and reach. The types of applications supported over the Internet are also changing, from basic applications such as web browsing to applications with real-time constraints such as Internet Protocol (IP) telephony. The increased reliance on the Internet has also raised the risk that a single attack or failure could seriously disrupt communications. In particular, an attacker can potentially disable a network by flooding it with traffic. Such attacks are known as bandwidth-based distributed denial-of-service (DDoS) attacks. Different techniques can be used to identify the attack source and the attack source can be stored in a blacklist.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
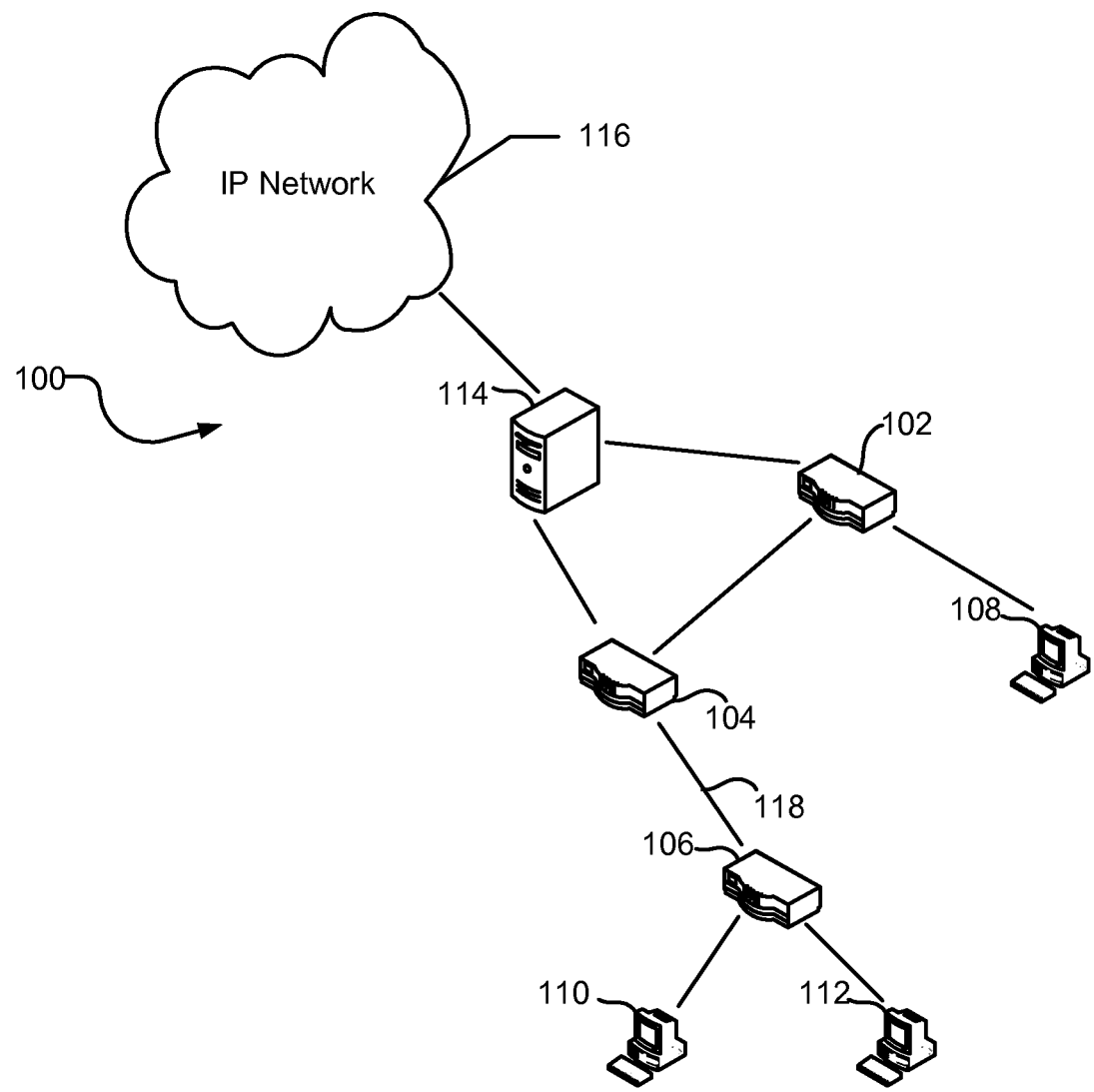
FIG. 1 is a diagram illustrating an embodiment of a communications network.

FIG. 1 shows a communications network 100, such as the Internet, including routers 102, 104, and 106, client systems 108, 110, and 112, and a blacklist filter server 114. The client system 108 is connected to the router 102 for access to the communications network 100. The client systems 110 and 112 are connected to the router 106 for access to the communications network 100. The blacklist filter server 114 is connected to the routers 102 and 104, and to an IP network 116. Router 102 can provide ingress and egress for client system 108. Router 106 can provide ingress and egress for both of client systems 110 and 112.

Bandwidth-based attacks, such as distributed denial of service (DDoS) attacks, can significantly increase network utilization. DDoS attacks can utilize a large number of attacking systems to flood a target system with traffic. As such, traffic flows from the attacking systems to the target system can experience a significant increase. For example, attacking systems near router 104 targeting the client system 110 or 112 can cause utilization of traffic flow between routers 104 and 106 to significantly increase. The increase in utilization of the traffic flow between the routers 104 and 106 can cause saturation of a network link 118. Saturation of network link 118 can affect traffic flows that travel through the saturated network link.

The blacklist filter server 114 can filter the IP traffic for the client systems 108, 110, and 112, or can filter the IP traffic for only one or two of the client systems. The blacklist filter server 114 can be controlled by the Internet service provider for the client systems 108, 110, and 112, to offer the client systems protection from unwanted IP traffic such as DDoS attacks, Spam attacks, scanning attacks, and the like. The unwanted IP traffic can come from a number of IP addresses, and can be complied together in a blacklist. There can be a number of blacklists available to the blacklist filter server 114, and each blacklist can contain a large number of IP addresses, making it impractical for the black filter server to filter out or block IP traffic from every IP address listed in the blacklist. The blacklist filter server 114 can determine the most significant IP addresses, the most significant IP address prefixes, and the like to select which IP address traffic to block from the client systems 108, 110, and 112.

While the blacklist filter server 114 blocks the undesirable IP traffic, some desirable IP traffic may also be blocked. The desirable traffic that is blocked can be referred to as collateral loss. The blacklist filter server 114 can use different filtering techniques to achieve a desired ratio of the amount of blocked and undesirable IP traffic to the amount of blocked but desirable traffic. For example, the blacklist filter server 114 can operate a static-all filter, a static-some filter, a dynamic-all filter, and a dynamic-some filter.

The static-all filter can be designed to block all IP addresses listed in the blacklist while minimizing the collateral loss for the client systems 108, 110, and 112 in the communications network 100. In executing the static-all filter, the blacklist filter server 114 can receive a blacklist containing a number of IP addresses identified as a source of unwanted IP traffic. Upon receiving the blacklist, the blacklist filter server 114 can assign an access control list to every source IP address selected from the blacklist. An access control list is a filtering technique that provides rules within an IP address filter for filtering out Internet traffic from certain source IP addresses without taking a destination IP address into consideration. Thus, the blacklist filter server 114 can use the access control lists to block Internet traffic from every source IP address listed in the blacklist without considering to which of the client systems 108, 110, and 112 the Internet traffic is being sent.

The blacklist filter server 114 can compile the collateral losses between a pair of bad addresses, can combine the pair of addresses that have the least collateral losses between them, and can thus cover the two addresses with a single combined access control list. For example, if source IP addresses 1.1.1.1, 1.1.1.4, 1.1.1.10, and 1.1.1.15 are listed in the blacklist, the blacklist filter server 114 can determine that the collateral loss between source IP addresses 1.1.1.1 and 1.1.1.4 is smaller than the collateral loss between source IP addresses 1.1.1.10 and 1.1.1.15. The collateral loss is less between source IP addresses 1.1.1.1 and 1.1.1.4 when fewer source IP addresses are blocked within the source IP address range of 1.1.1.1 to 1.1.1.4 than the source IP address range of 1.1.1.10 to 1.1.1.15. Thus, the combined access control list can block Internet traffic from source IP addresses 1.1.1.1, 1.1.1.2, 1.1.1.3, and 1.1.1.4, and the source IP addresses 1.1.1.2 and 1.1.1.3 can be defined as collateral loss because they were not originally listed in the blacklist. This process can be repeated, so that an optimal tradeoff can be reached between the number of IP addresses in the blacklist blocked and the smallest possible number of desirable source IP addresses blocked. The tradeoff can efficiently block the bad source IP address by reducing the number of access control lists, and can keep the number of desirable source IP addresses blocked to a minimum.

The combined access control list can be a source IP range access control list and/or a common source IP subnet access control list. The source IP range access control list can block the IP traffic from all of the source IP addresses located within the range of the pair of source IP address to be blocked by the combined source access control list without taking a destination IP address into consideration. For example, the source IP address range access control list can block the source IP addresses within the range of source IP addresses from 1.1.1.1 to 1.1.1.4. The common source IP subnet access control list can block all the source IP addresses located within a common subnet of the pair of source IP addresses to be blocked by the combined access control list without taking a destination IP address into consideration. For example, the common source IP subnet access control list can be IP subnet access control list 1.1.1.0/29, which can block Internet traffic from source IP address 1.1.1.0 to 1.1.1.7. A common subnet of IP addresses can be a set of two, four, eight, sixteen, or the more adjacent IP addresses.

In an embodiment, the access control lists can also be source/destination access control lists, such that the source IP address and the destination IP address are taken into consideration. Thus, the source/destination access control lists in the blacklist filter server 114 can block different source IP addresses based on the client system 108, 110, or 112 identified as the destination IP address. For example, the user of the client system 108 could not want to block Internet traffic from a specific source IP address, however the user of the client system 110 could want to block Internet traffic from the same source IP address. Thus, the source/destination access control list can determine the source IP address and the destination IP address before blocking the Internet traffic or not.

The static-some filter can be designed to block some of the source IP addresses selected from the blacklist, trading-off a decrease in the number of bad source IP addresses filtered for a decrease in the collateral loss for the client systems 108, 110, and 112 in the communications network 100. Upon receiving the blacklist and executing the static-some filter, a weight can be assigned to every source IP address so as to optimize the trade-off between the total collateral loss and the total benefit associated with blocking bad source IP addresses without taking a destination IP address into consideration. Thus, the network provider has the flexibility to control the output of the static-some filter. In an embodiment, a weight greater than zero can be assigned to good source IP addresses, and a weight lower than zero can be assigned to bad source IP addresses.

The weights can also be tuned to assign different access privileges to different users, such as higher positive weights being assigned to trusted or preferred source IP addresses, and more negative weights being assigned to source IP addresses that are responsible for the highest number of malicious activities. For example, a source IP address assigned a weight of positive ten is trusted more than a source IP address assigned a weight of positive five. Similarly, a source IP address assigned a weight of negative ten is responsible for more malicious activities than a source IP address assigned a weight of negative five. Alternatively, a weight equal to one can be assigned to all of the good source IP addresses, and a weight equal to zero can be assigned to all of the bad source IP addresses. Thus, based on the weights assigned to each of the source IP addresses, the static-some filter can tradeoff the amount of collateral loss with the number of bad source IP addresses blocked by combing access control lists based on the weights assigned to the source IP addresses without taking a destination IP address into consideration.

In an embodiment, the weights assigned to the source IP addresses can vary based on the destination IP address of the Internet traffic. For example, the user of client system 110 can assign a specific weight to a source IP address, and the user of client system 112 can assign a different weight to the same IP address. Thus, the access control lists in the blacklist filter server 114 can block Internet traffic from different source IP addresses for each of the client systems 108, 110, and 112. Therefore, the access control lists are source/destination access control lists, because the access control lists can take into consideration not only the source IP address but also the destination IP address of the Internet traffic.

The dynamic-all filter can be designed to block all of the source IP addresses selected from a time-varying blacklist so as to minimize the collateral loss for the client systems 108, 110, and 112 in the communications network 100 without taking a destination IP address into consideration. Blocking the source IP addresses located in the time-varying blacklist can be based on instances of the blacklist at different times. The goal of the dynamic-all filter is the same as the static-all filter, which is to filter out all of the bad source IP addresses at minimum collateral loss in every time slot of the blacklist without taking a destination IP address into consideration. When a new blacklist is received, the source IP addresses listed can be the same as the previous blacklist, one or more source IP addresses can be added to the blacklist, and/or one or more source IP addresses can be removed from the blacklist. If a new source IP address is added, a new source access control list can be assigned to the new source IP address, and a determination can be made whether the new source access control list can be merged with an existing source access control list. If a source IP address is removed, a determination is made whether the source access control list associated with the removed source IP address should also be removed.

The dynamic-some filter can be designed to block some of the source IP addresses selected from a time-varying blacklist similar to the static-some filter, but using instances of the blacklist at different times for the client systems 108, 110, and 112 in the communications network 100. When a new blacklist is received with a new source IP address, a new source access control list is added to cover each of the new source IP address. A weight can be assigned to the new source access control list, which can vary based on a sum of weights of good and bad source IP addresses associated with the source access control list. The new source access control list then can be merged with an existing source access control list, or the source access control list with the smallest contribution can be removed. The source access control list with the smallest contribution can be the source access control list that blocks IP traffic from the fewest bad source IP addresses. If one or more source IP addresses are removed from the new blacklist, the blacklist filter server 114 can determine whether the source access control list associated with the removed source IP address is still the smallest contributor among all of the unused source access control lists. Otherwise, the source access control list that gives the smallest contribution is preferably added instead of the source access control list associated with the removed source IP address.

Figure 2:
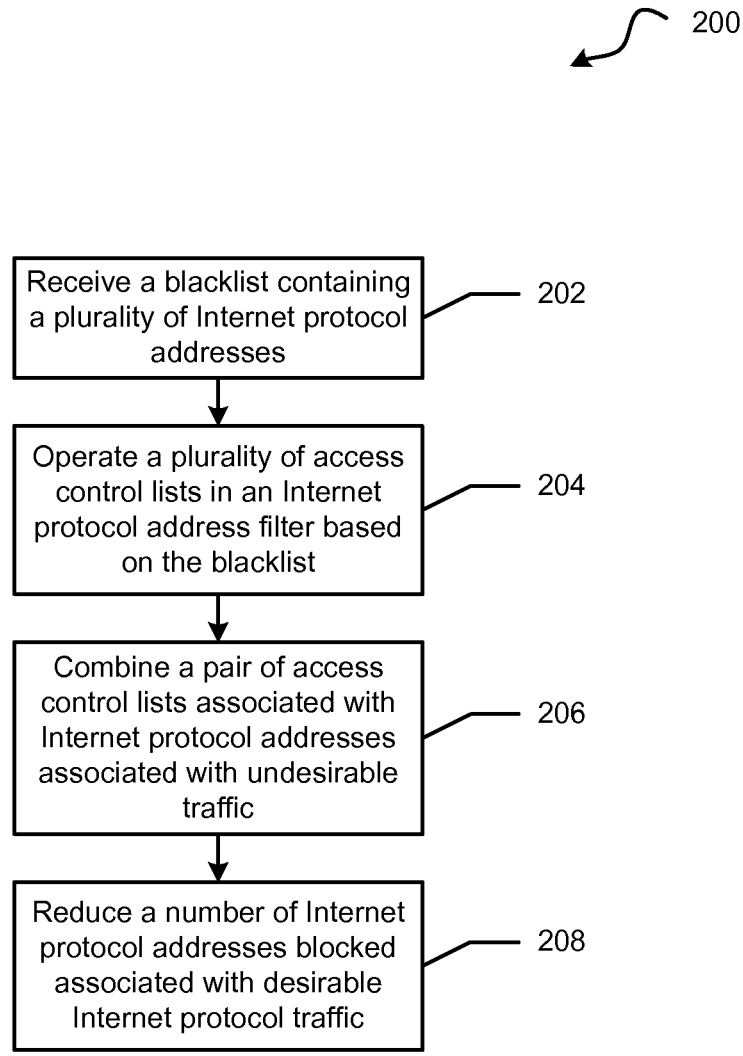
FIG. 2 is a flow diagram of a method for using a static-all filter to block unwanted Internet protocol traffic based on a blacklist.

FIG. 2 shows a flow diagram of a method 200 for using a static-all filter to block unwanted Internet protocol traffic based on a blacklist. At block 202, a blacklist containing a plurality of source Internet protocol addresses is received. The source Internet protocol addresses are associated with unwanted IP traffic, such as DDoS, Spam, and the like. Based on the source IP addresses in the blacklist, a plurality of source access control lists is operated at block 204. At block 206, a pair of source access control lists associated with source IP addresses containing the unwanted IP traffic are combined without taking a destination IP address into consideration. At block 208, a number of source IP addresses associated with desirable IP traffic that are blocked is reduced.

Figure 3:
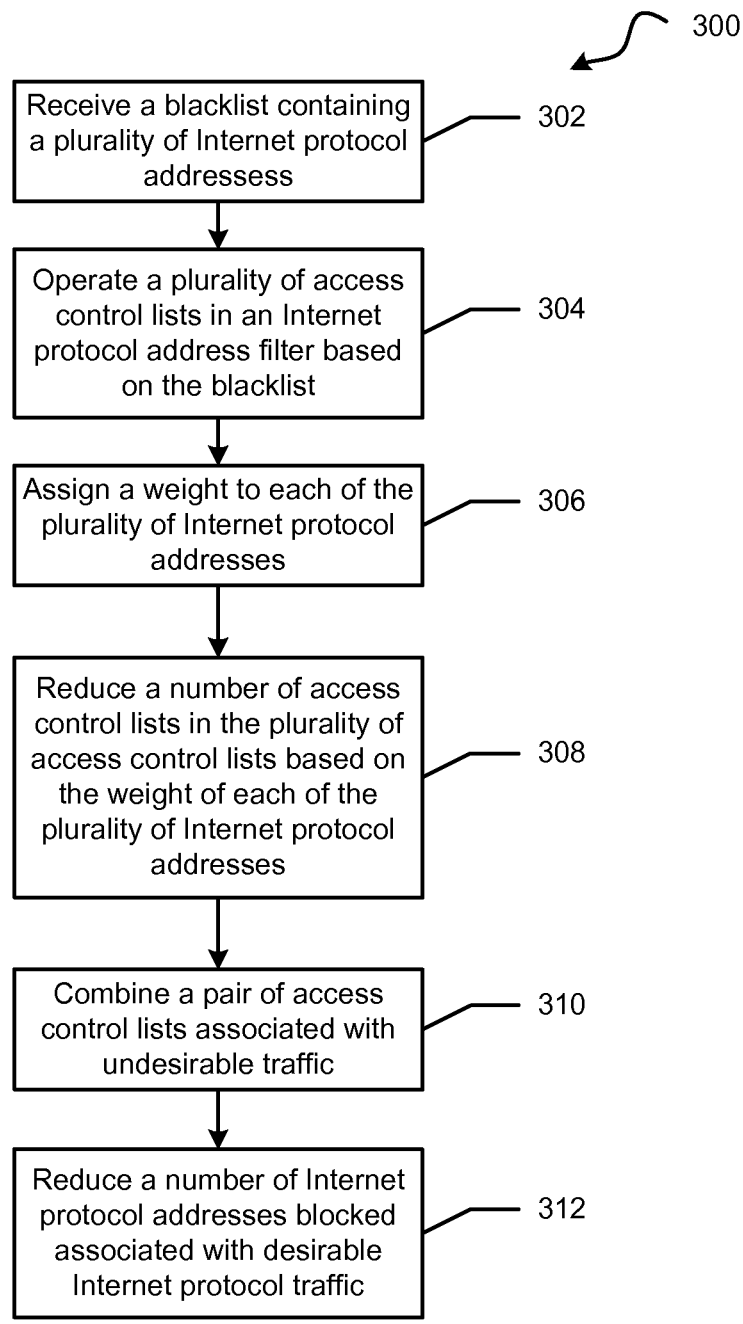
FIG. 3 is a flow diagram of a method for using a static-some filter to block unwanted Internet protocol traffic based on the blacklist.

FIG. 3 shows a flow diagram of a method 300 for using a static-some filter to block unwanted Internet protocol traffic based on a blacklist. At block 302, a blacklist containing a plurality of source IP addresses associated with unwanted IP traffic is received. A plurality of source access control lists is operated based on the blacklist at block 304. At block 306, a weight is assigned to each of the source IP addresses based on an amount of unwanted traffic associated each of the source IP addresses. A number of source access control lists, in the plurality of source access control lists, are reduced based on the weight assigned to each of the each of the source IP addresses at block 308. At block 310, source access control lists for IP addresses associated with unwanted IP addresses are combined without taking a destination IP address into consideration. A number of source IP addresses associated with desirable IP traffic that are blocked are reduced at block 312.

Figure 4:
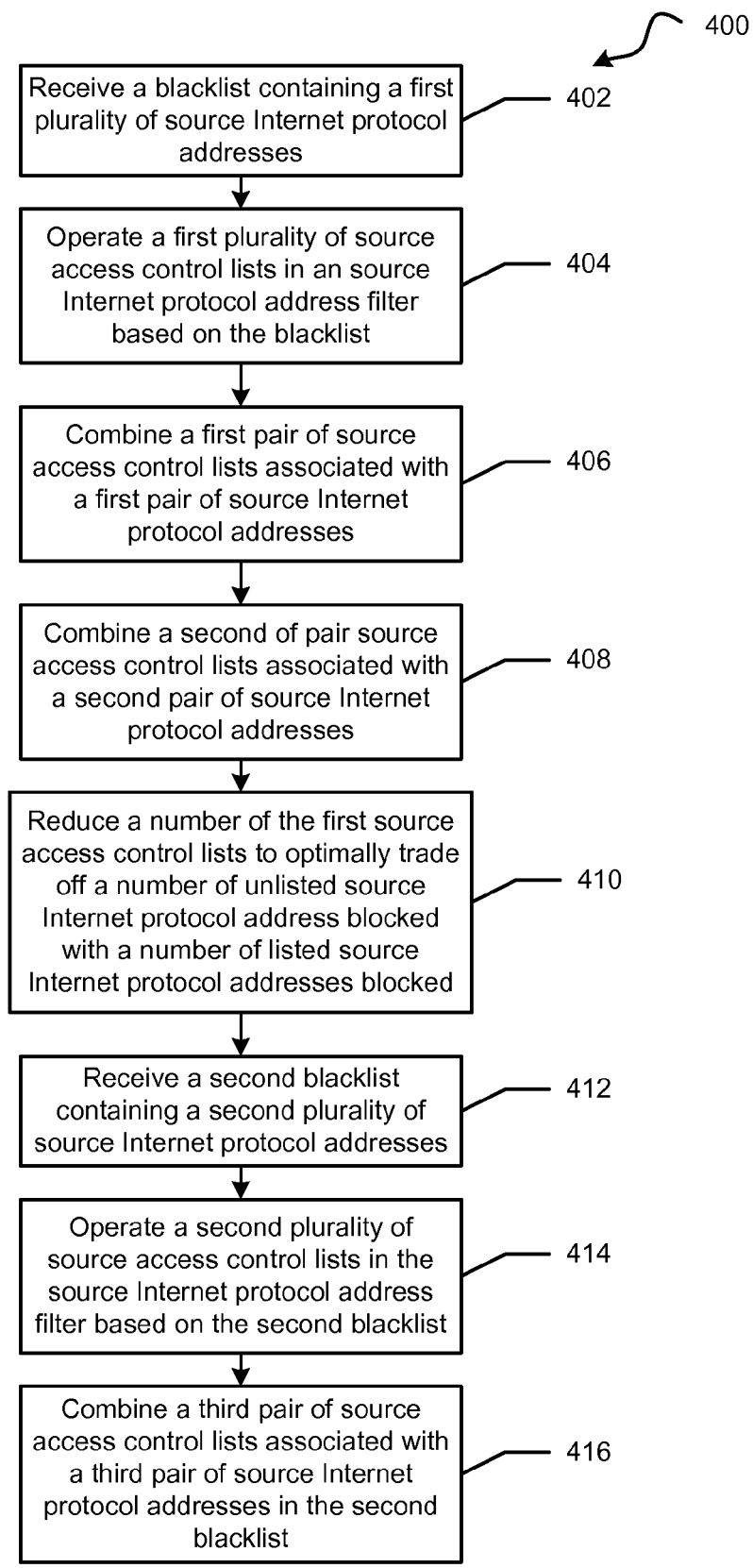
FIG. 4 is a flow diagram of a method for using a dynamic-all filter to block unwanted Internet protocol traffic based on a time-varying blacklist.

FIG. 4 shows a flow diagram of a method 400 for using a dynamic-all filter to block unwanted Internet protocol traffic based on a time-varying blacklist. At block 402, a first blacklist containing a first plurality of source IP addresses associated with unwanted IP traffic is received. Based on the source IP addresses in the first blacklist, a first plurality of source access control lists in an IP address filter is operated at block 404. Each of the first plurality of source access control lists can be adapted to block the unwanted IP traffic from one of the first source IP addresses listed in the first blacklist. At block 406, a first pair of source access control lists associated with a first pair of source IP addresses listed in the first blacklist are combined into a first combined source access control list based on a first smallest number of desirable source IP addresses blocked by the first combined source access control list. The first combined access control list can be an IP range access control list and/or a common IP subnet access control list. The IP range access control list can block the IP traffic from all of the IP addresses located within the range of the pair of IP address to be blocked by the first combined access control list. The common IP subnet access control list can block all the IP addresses located within a common subnet of the pair of IP addresses to be blocked by the first combined access control list. A common subnet of IP addresses can be a set of two, four, eight, sixteen, or more adjacent IP addresses.

At block 408, a second pair of source access control lists associated with a second pair of source IP addresses listed in the first blacklist are combined into a second combined access control list based on a second smallest number of desirable source IP addresses blocked by the second combined source access control list. At block 410, a number of the first plurality of source access control lists are reduced to optimally tradeoff a number of desirable source IP addresses blocked with a number of bad source IP addresses blocked.

At block 412, a second blacklist containing a second plurality of source IP addresses associated with unwanted IP traffic is received. Based on the source IP addresses in the second blacklist, a second plurality of source access control lists in the IP address filter is operated at block 414. Each of the second plurality of source access control lists can be adapted to block the unwanted IP traffic from one of the second source IP addresses listed in the second blacklist. A third pair of source access control lists associated with a third pair of source IP addresses listed in the second blacklist are combined into a third combined source access control list based on a third smallest number of desirable source IP addresses blocked by the third combined source access control list at block 416.

Figure 5:
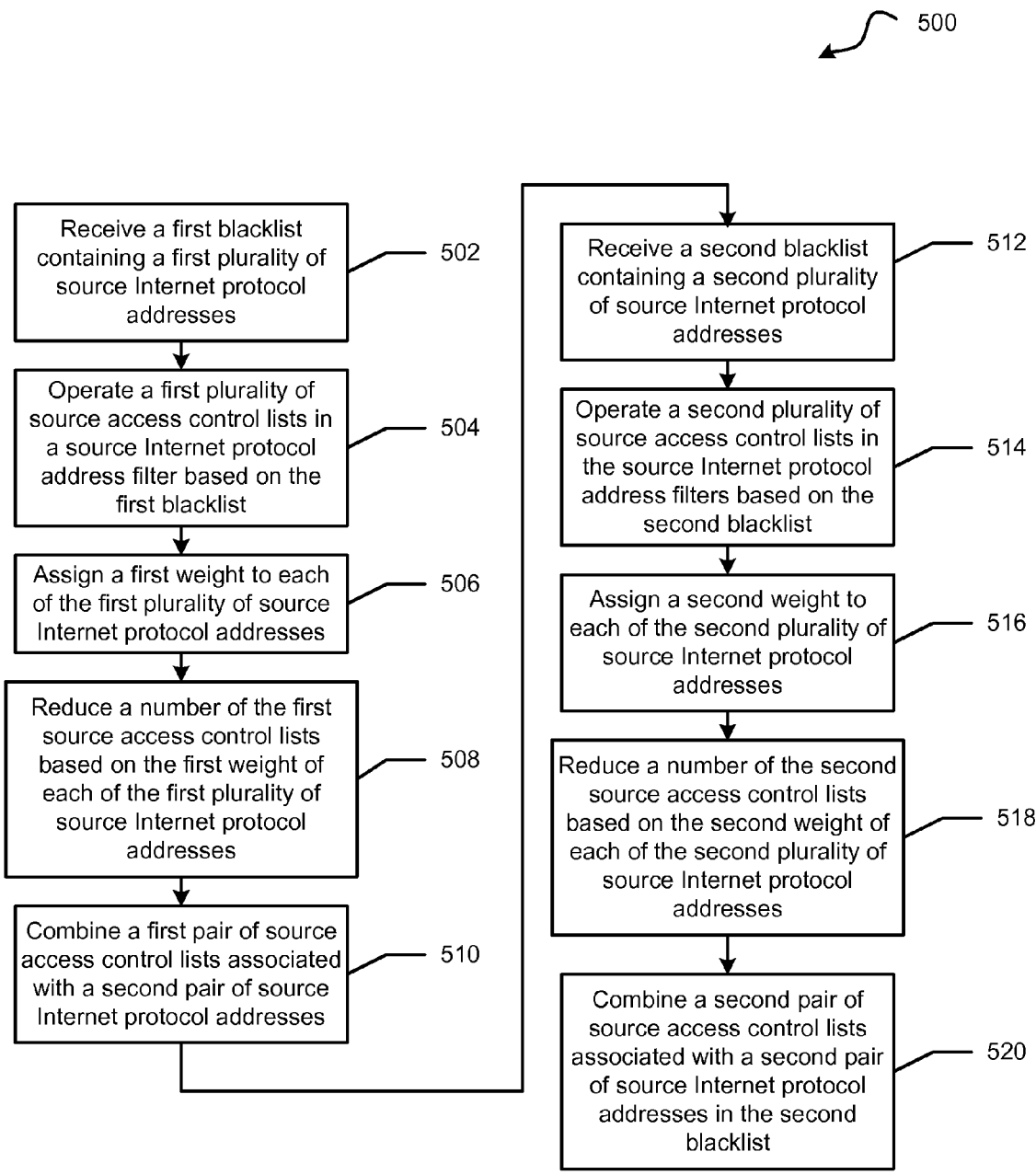
FIG. 5 is a flow diagram of a method for using a dynamic-some filter to block unwanted Internet protocol traffic based on the time-varying blacklist.

FIG. 5 shows a flow diagram of a method 500 for using a dynamic-some filter to block unwanted Internet protocol traffic based on a time-varying blacklist. At block 502, a first blacklist containing a first plurality of source IP addresses associated with unwanted IP traffic is received. A first plurality of source access control lists in an IP address filter is operated based on the first blacklist at block 504. Each of the first plurality of source access control list can be adapted to block the unwanted IP traffic from one of the first source IP addresses listed in the first blacklist. At block 506, a first weight is assigned to each of the first source IP addresses based on a reliability of Internet traffic from each of the first source IP addresses. A number of the first source access control lists in the first plurality access control lists are reduced to optimally tradeoff a number of desirable source IP addresses blocked with a number of bad source IP addresses blocked based on the first weight of each of the first source IP addresses at block 508.

At block 510, a first pair of source access control list associated with a first pair of the first source IP addresses listed in the first blacklist are combined into a first combined source access control list based on the first weight of each of the first source IP addresses blocked by the first combined access control list. At block 512, a second blacklist containing a second plurality of source IP addresses associated with unwanted IP traffic is received. A second plurality of source access control lists in the IP address filters is operated based on the second blacklist at block 514. Each of the second plurality of source access control lists can be adapted to block the unwanted IP traffic from one of the second source IP addresses listed in the second blacklist. At block 516, a second weight is assigned to each of the second plurality of source IP addresses based on the reliability of the Internet traffic from each of the second source IP addresses. At block 518, a number of the second source access control lists in the second plurality of source access control lists are reduced to optimally tradeoff a number of desirable source IP addresses blocked with a number of bad source IP addresses blocked based on the second weight of each of the second plurality of source IP addresses. At block 520, a second pair of source access control lists associated with a second pair of the second source IP addresses listed in the second blacklist are combined into a second combined source access control list based on the second weight of each of the second source IP addresses blocked by the combined source access control list.

Figure 6:
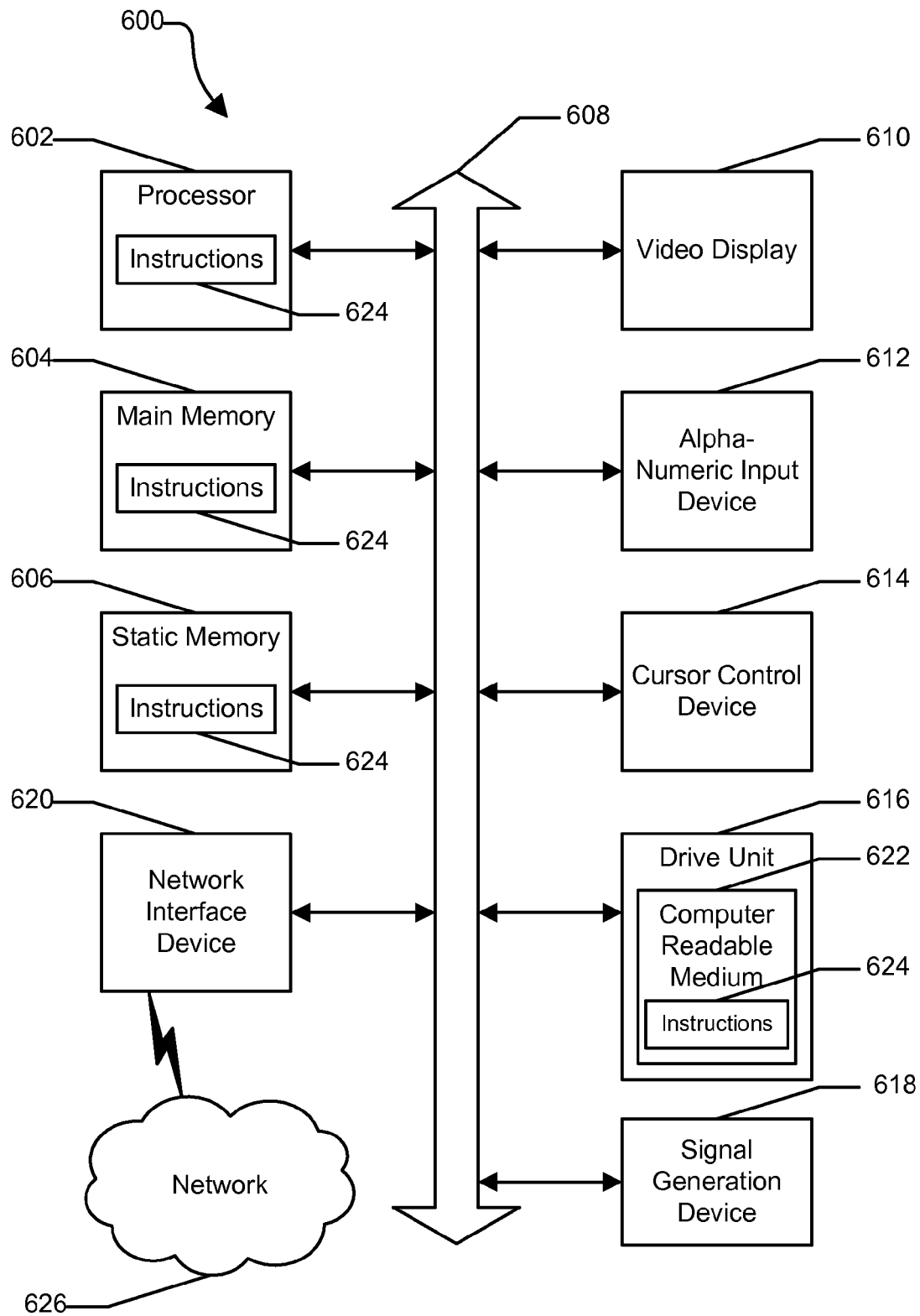
FIG. 6 is a block diagram of a general computer system.

FIG. 6 shows an illustrative embodiment of a general computer system 600 in accordance with at least one embodiment of the present disclosure. The computer system 600 can include a set of instructions that can be executed to cause the computer system to perform any one or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
    receiving a first blacklist containing a first plurality of internet protocol addresses associated with unwanted internet traffic;
    determining that a number of the first plurality of internet protocol addresses in the first blacklist exceeds a threshold number of internet protocol addresses to be blocked;
    selecting a second plurality of internet protocol addresses out of the first internet protocol addresses from which to block the unwanted internet traffic, each of the second internet protocol addresses having a highest amount of unwanted internet traffic in the first internet protocol addresses;
    operating a first plurality of access control lists to block the unwanted internet traffic from one of the second internet protocol addresses in the first blacklist;
    combining a first pair of access control lists into a first combined access control list based on a first smallest number of desirable internet protocol addresses blocked by the first combined access control list, wherein the first combined access control list blocks the unwanted traffic addressed to a first destination internet protocol address and allows the unwanted internet traffic addressed to a second destination internet protocol address;
    receiving a new internet protocol address associated with unwanted internet traffic;
    assigning a new access control list to the new internet protocol address;
    assigning a weight to the new access control list, wherein the weight of the new access control list is based in part on a sum of weights of internet protocol addresses associated with the new access control list; and
    combining the new access control list with the first combined access control list to create a new combined access control list when an optimal trade off is created between a number of desirable internet protocol addresses blocked and a number of bad internet protocol addresses blocked, wherein the new access control list is combined with the first combined access control list based on the weight assigned to the new access control list.

2. The method of claim 1 further comprising:
    combining a second pair of access control lists into a second combined access control list based on a second smallest number of desirable internet protocol addresses blocked by the second combined access control list.

3. The method of claim 1 wherein the unwanted internet traffic is associated with a distributed denial-of-service attack.

4. The method of claim 1 wherein unwanted internet traffic is associated with an electronic mail message.

5. The method of claim 1 wherein the first combined access control list blocks the unwanted internet traffic from an internet protocol address range between a pair of internet protocol address.

6. The method of claim 1 further comprising:
    reducing a number of the first access control lists to optimally trade off the number of desirable internet protocol addresses blocked with the number of bad internet protocol addresses blocked.

7. The method of claim 1 further comprising:
    receiving a second blacklist containing a third plurality of internet protocol addresses;
    operating a second plurality of access control lists to block the unwanted internet traffic from one of the third internet protocol addresses in the second blacklist; and
    combining a second pair of access control lists into a second combined access control list based on a second smallest number of desirable internet protocol addresses blocked by the second combined access control list.

8. A method comprising:
    receiving a first blacklist containing a first plurality of internet protocol addresses associated with unwanted internet traffic;
    determining that a number of the first plurality of internet protocol addresses in the first blacklist exceeds a threshold number of internet protocol addresses to be blocked;
    selecting a second plurality of internet protocol addresses out of the first internet protocol addresses from which to block the unwanted internet traffic, each of the second internet protocol addresses having a highest amount of unwanted internet traffic in the first internet protocol addresses;
    operating a first plurality of access control lists to block the unwanted internet traffic from one of the second internet protocol addresses listed in the first blacklist;
    assigning a first weight to each of the second internet protocol addresses based on a reliability of internet traffic from each of the second internet protocol addresses, wherein trusted source internet protocol addresses are assigned a weight above zero, and source internet protocol addresses responsible for malicious activities are assigned a weight below zero;
    reducing a first number of the first access control lists to optimally trade off a number of desirable internet protocol addresses blocked with a number of bad internet protocol addresses blocked based on the first weight of each of the second internet protocol addresses;
    receiving a new internet protocol address associated with unwanted internet traffic;
    assigning a new access control list to the new internet protocol address;
    assigning a weight to the new access control list, wherein the weight of the new access control list is based in part on a sum of weights of internet protocol addresses associated with the new access control list; and combining the new access control list with one of the first access control lists to create a first combined access control list when an optimal trade off is created between the number of desirable internet protocol addresses blocked and the number of bad internet protocol addresses blocked, wherein the new access control list is combined with the first combined access control list based on the weight assigned to the new access control list.

9. The method of claim 8 further comprising:
combining a pair of access control lists into a second combined access control list based on the first weight of each of the second internet protocol addresses blocked by the combined access control list.

10. The method of claim 9 wherein unwanted internet traffic is associated with an electronic mail message.

11. The method of claim 9 wherein the first combined access control list blocks the unwanted internet traffic from an internet protocol address range between a pair of internet protocol address.

12. The method of claim 8 wherein the unwanted internet traffic is associated with a distributed denial-of-service attack.

13. The method of claim 8 further comprising:
receiving a second blacklist containing a third plurality of internet protocol addresses associated with the unwanted internet traffic; and
operating a second plurality of access control lists to block the unwanted internet traffic from one of the third internet protocol addresses listed in the second blacklist;
assigning a second weight to each of the third plurality of internet protocol addresses based on the reliability of the internet traffic from each of the third internet protocol addresses; and
reducing a second number of the second access control lists to optimally trade off the number of desirable internet protocol addresses blocked with the number of bad internet protocol addresses blocked based on the second weight of each of the third plurality of internet protocol addresses.

14. The method of claim 13 further comprising:
combining a pair of access control lists into a combined access control list based on the second weight of each of the third internet protocol addresses blocked by the combined access control list.

15. A computer readable device comprising a plurality of instructions, which when loaded and executed by a processor, cause the processor to perform operations comprising:
receiving a first blacklist containing a first plurality of internet protocol addresses associated with unwanted internet traffic;
determining that a number of the first plurality of internet protocol addresses in the first blacklist exceeds a threshold number of internet protocol addresses to be blocked;
selecting a second plurality of internet protocol addresses out of the first internet protocol addresses from which to block the unwanted internet traffic, each of the second internet protocol addresses having a highest amount of unwanted internet traffic in the first internet protocol addresses;
operating a first plurality of access control lists to block the unwanted internet traffic from one of the second internet protocol addresses listed in the first blacklist;
assigning a first weight to each of the second internet protocol addresses based on a reliability of internet traffic from each of the second internet protocol addresses, wherein the first weight assigned to each of the second internet protocol addresses is also based on a destination internet protocol address of internet traffic;
reducing a first number of the first access control lists to optimally trade off a number of desirable internet protocol addresses blocked with a number of bad internet protocol addresses blocked based on the first weight of each of the second internet protocol addresses;
receiving a new internet protocol address associated with unwanted internet traffic;
assigning a new access control list to the new internet protocol address;
assigning a weight to the new access control list, wherein the weight of the new access control list is based in part on a sum of weights of internet protocol addresses associated with the new access control list; and
combining the new access control list with one of the first access control lists to create a first combined access control list when an optimal trade off is created between the number of desirable internet protocol addresses blocked and the number of bad internet protocol addresses blocked, wherein the new access control list is combined with the first combined access control list based on the weight assigned to the new access control list.

16. The computer readable device of claim 15 further comprising combining a pair of access control lists into a second combined access control list based on the first weight of each of the second internet protocol addresses blocked by the combined access control list.

17. The computer readable device of claim 16 wherein unwanted internet traffic is associated with an electronic mail message.

18. The computer readable device of claim 16 wherein the first combined access control list blocks the unwanted internet traffic from an internet protocol address range between a pair of internet protocol address.

19. The computer readable device of claim 15 wherein the unwanted internet traffic is associated with a distributed denial-of-service attack.

20. The computer readable device of claim 15 wherein the operations further comprise:
receiving a second blacklist containing a third plurality of internet protocol addresses associated with the unwanted internet traffic; and
operating a second plurality of access control lists to block the unwanted internet traffic from one of the third internet protocol addresses listed in the second blacklist;
assigning a second weight to each of the third plurality of internet protocol addresses based on the reliability of the internet traffic from each of the third internet protocol addresses; and
reducing a second number of the second access control lists to optimally trade off the number of desirable internet protocol addresses blocked with the number of bad internet protocol addresses blocked based on the second weight of each of the third plurality of internet protocol addresses.

* * * * *